(12) United States Patent
Sheng et al.

(10) Patent No.: US 10,719,258 B2
(45) Date of Patent: Jul. 21, 2020

(54) INFORMATION SECURITY MANAGEMENT SYSTEM AND MULTIFUNCTION PRINTER USING THE SAME

(71) Applicants: AVISION (SUZHOU) CO., LTD., Jiangsu (CN); AVISION INC.

(72) Inventors: Shao-Lan Sheng, Hsinchu (TW); Yen-Cheng Chen, Hsinchu (TW); Chen-Chang Li, Miaoli County (TW); Po-Sheng Shih, Hsinchu County (TW)

(73) Assignee: AVISION INC., Hsinchu (TW)

( * ) Notice: Subject to any disclaimer, the term of this patent is extended or adjusted under 35 U.S.C. 154(b) by 211 days.

(21) Appl. No.: 15/766,365

(22) PCT Filed: Nov. 15, 2016

(86) PCT No.: PCT/CN2016/105853
§ 371 (c)(1),
(2) Date: Apr. 5, 2018

(87) PCT Pub. No.: WO2017/088684
PCT Pub. Date: Jun. 1, 2017

(65) Prior Publication Data
US 2018/0293019 A1 Oct. 11, 2018

(30) Foreign Application Priority Data
Nov. 24, 2015 (CN) .......................... 2015 1 0830156

(51) Int. Cl.
*G06K 9/36* (2006.01)
*G06F 3/06* (2006.01)
(Continued)

(52) U.S. Cl.
CPC .......... *G06F 3/0652* (2013.01); *G06F 21/608* (2013.01); *G06K 9/00456* (2013.01);
(Continued)

(58) Field of Classification Search
CPC .......... H04N 1/00204; H04N 1/00912; H04N 1/32358; H04N 2201/0039; H04N 2201/0094
(Continued)

(56) References Cited

U.S. PATENT DOCUMENTS 7,006,383 B2 * 2/2006 Tanaka .................. G11C 16/349
365/185.11
7,627,181 B2 12/2009 Tamura et al.
(Continued)

FOREIGN PATENT DOCUMENTS

CN 1242905 A 1/2000
CN 1348130 A 5/2002
(Continued)

OTHER PUBLICATIONS

CN Office Action in Application No. 201510830156.7 dated Dec. 4, 2019.

*Primary Examiner* — Charlotte M Baker
(74) *Attorney, Agent, or Firm* — Maschoff Brennan

(57) ABSTRACT

An information security management system and a multifunction printer thereof are provided. The multifunction printer includes an image capturing module, an image processing module, an output module and a transmission module. The image capturing module captures a data image of a document paper. The image processing module is coupled to the image capturing module and encodes the data image to generate first encoded data. The output module is coupled to the image processing module and prints second encoded data related to the data image. The transmission module is coupled to the image processing module and transmits one of the first and second encoded data. The multifunction printer deletes the first encoded data from a memory after transmitting the first encoded data, and deletes the second
(Continued)

encoded data from the memory after transmitting/outputting the second encoded data.

16 Claims, 2 Drawing Sheets

(51) Int. Cl.
    *H04N 1/64*          (2006.01)
    *G06K 9/03*          (2006.01)
    *H04N 1/44*          (2006.01)
    *G06F 21/60*        (2013.01)
    *G06K 9/00*         (2006.01)
    *G06K 9/20*         (2006.01)

(52) U.S. Cl.
    CPC .............. *G06K 9/03* (2013.01); *H04N 1/4446* (2013.01); *H04N 1/4486* (2013.01); *H04N 1/64* (2013.01); *G06K 9/00442* (2013.01); *G06K 9/2063* (2013.01)

(58) Field of Classification Search
    USPC .......... 382/233; 365/185.29, 185.11, 185.12; 358/1.15, 1.1, 1.12, 1.13, 1.14, 1.16, 1.17, 358/1.18, 1.9; 726/35, 26
    See application file for complete search history.

(56) References Cited

U.S. PATENT DOCUMENTS

| | | | |
|---|---|---|---|
| 7,826,078 B2 * | 11/2010 | Okamoto | H04N 1/00912 358/1.1 |
| 8,117,665 B2 | 2/2012 | Kawabuchi et al. | |
| 2003/0179417 A1 | 9/2003 | Yoshida | |
| 2003/0188199 A1 * | 10/2003 | Tadano | G06F 21/35 726/35 |

FOREIGN PATENT DOCUMENTS

| | | |
|---|---|---|
| CN | 1479197 A | 3/2004 |
| CN | 1747525 A | 3/2006 |
| CN | 1808415 A | 7/2006 |
| CN | 101369296 A | 2/2009 |
| CN | 101500047 A | 8/2009 |
| CN | 101710446 A | 5/2010 |
| CN | 102348114 A | 2/2012 |
| EP | 0 946 052 A1 | 9/1999 |

* cited by examiner

INFORMATION SECURITY MANAGEMENT SYSTEM AND MULTIFUNCTION PRINTER USING THE SAME

CROSS-REFERENCE TO RELATED APPLICATIONS

This non-provisional application claims priority under 35 U.S.C. § 119(a) on Patent Application No(s). CN201510830156.7 filed in China on Nov. 24, 2015, the entire contents of which are hereby incorporated by reference.

BACKGROUND

Technical Field

The disclosure relates to an information security management system and a multifunction printer therein, more particularly to an information security management system having a data deletion function, and a multifunction printer therein.

Related Art

For the past few years, the advance of technology has caused the great popularization of multifunction printers in human life. Multifunction printers are used to deal with requirements of the copying, scanning and printing of document papers for home entertainment and for business requirements in offices. In the aspect of business requirements, because of the advance in function and the enhancement of convenience, multifunction printers have become an important role in a company's operation.

Although multifunction printers have advanced in functions and practicality, their ability of managing information security still has some deficiencies. Therefore, it is important to improve existing multifunction printers in order to reduce the risk in information security during the usage of multifunction printers.

SUMMARY

The disclosure provides an information security management system and a multifunction printer therein to enhance the ability of information security management of the multifunction printer in use.

According to one or more embodiments, the multifunction printer includes an image capturing module, an image processing module, an output module and a transmission module. The image capturing module captures a data image of a document paper. The image processing module is coupled to the image capturing module and encodes the data image to generate first encoded data. The output module is coupled to the image processing module and outputs second encoded data related to the data image. The transmission module is coupled to the image processing module and transmits at least one of the first and second encoded data. The multifunction printer deletes the first encoded data stored in a memory after the first encoded data is transmitted, and deletes the second encoded data stored in the memory after the second encoded data is transmitted and/or outputted.

According to one or more embodiments, the information security management system includes a server and a multifunction printer. The multifunction printer connects to the server through a communication network. The multifunction printer includes an image capturing module, an image processing module, an output module and a transmission module. The image capturing module captures a data image of a document paper. The image processing module is coupled to the image capturing module and encodes the data image to generate first encoded data. The output module is coupled to the image processing module and outputs second encoded data related to the data image. The transmission module is coupled to the image processing module and transmits the first encoded data and the second encoded data to the server through the communication network. The multifunction printer deletes the first encoded data, stored in a memory, after transmitting the first encoded data, and deletes the second encoded data, stored in the memory, after transmitting and/or outputting the second encoded data.

According to the one or more embodiments of the multifunction printer and the information security management system, the disclosure transmits the encoded data generated by the multifunction printer, to a device outside the multifunction printer and deletes it from the memory after transmitting it. Therefore, the disclosure may reduce the possibility of illegally acquiring data. Moreover, when the encoded data, generated by the multifunction printer, is transmitted to the server through the communication network, the disclosure can perform an information security analysis to the transmitted encoded data and then determine whether to generate a relative alarm message. Therefore, the disclosure may also enhance the ability of information security management efficiently.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
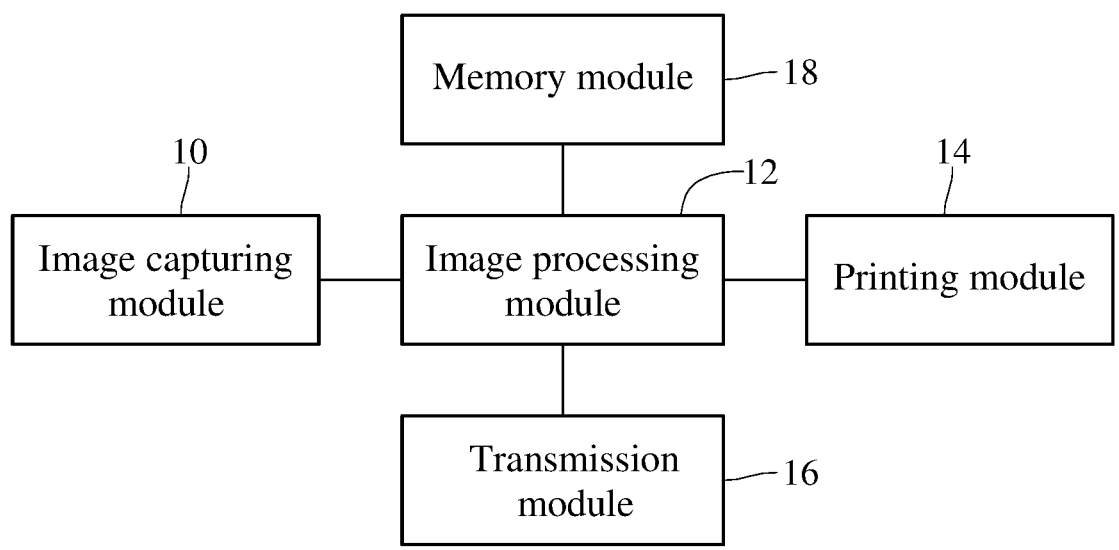
FIG. 1 is a schematic structure diagram of a multifunction printer in an embodiment.

Please refer to FIG. 1. FIG. 1 is a schematic structure diagram of a multifunction printer 1 in an embodiment. The multifunction printer 1 includes an image capturing module 10, an image processing module 12, a printing module 14, and a transmission module 16. The image capturing module 10 captures a data image of a document paper, that is, photographs the document paper to generate the data image. The image processing module 12 is coupled to the image capturing module 10 and encodes the data image to generate first encoded data. Instances of the format of the first encoded data include general image formats, e.g. JPEG, PNG or BMP, or another format used to record image information.

The printing module 14 is coupled to the image processing module 12 and prints out the second encoded data. The transmission module 16 is coupled to the image processing module 12 uses its wired or wireless transmission interface to transmit the first and second encoded data to a device outside the multifunction printer 1. The multifunction printer 1 deletes the first encoded data, stored in a memory, after transmitting the first encoded data, and deletes the second encoded data, stored in the memory, after transmitting the second encoded data. In this embodiment, instances of the format of the second encoded data include JBIG, MMR, MH or another image compression standard for multifunction printers.

Although the disclosure uses the printing module 14 as an example, other embodiments may be contemplated in other output modules. For example, the output module is an email transmission module for sending an appointed email box the second encoded data, such as a color or gray image compressed file (e.g. a JPEG, PNG or BMP file) or an image file (e.g. a TIF, PS or PDF file) of the document paper. In another example, the output module is a fax module for faxing the second encoded data with the document paper to a fax receiver. The disclosure has no limitation in the function of the output module.

In an exemplary situation in usage, when the multifunction printer 1 is used to scan a document paper, the image capturing module 10 captures a data image of a document paper. The data image is, for example, but not limited to, analog data. Then, the image processing module 12 samples and encodes the data image to generate first digital encoded data (referred to as first encoded data hereinafter). Therefore, the user can acquire the first encoded data from the transmission module 16. After the multifunction printer 1 transmits the first encoded data, this first encoded data will be deleted from the memory in order to present it from being hacked.

In another exemplary situation in usage, when the multifunction printer 1 is used to copy a document paper, the printing module 14 prints out the first encoded data after the first encoded data is generated as described above. The first encoded data is deleted from the memory after being printed out and transmitted.

In yet another exemplary situation in usage, when the multifunction printer 1 is used to print out a document paper, the image processing module 12 first encodes the content of the document paper into second encoded data and then the printing module 14 prints the second encoded data. After printing the second encoded data, the multifunction printer 1 deletes the second encoded data from the memory. In practice, in addition to deleting the encoded data after the encoded data is transmitted, the multifunction printer 1 is not disposed with any non-volatile storage device interface, e.g. a built-in hard disk drive or a USB port that is used to connect other external storage devices, for storing encoded data. Therefore, any encoded data will not be stored in the multifunction printer 1.

In an embodiment, the transmission module 16 connects to a server through a communication network, so as to transmit the scanned, copied or printed encoded data to the server. After receiving the encoded data, the server analyzes the received encoded data.

When the analysis result indicates that the encoded data belongs to a document that is forbidden to scan, copy or print, the server will send out a relative information security alarm message. In another embodiment, the image processing module 12 combines the data image and a feature of the document paper into the first encoded data. This feature is, for example, but not limited to, text content or pattern content, which is used to form a visible or invisible digital watermark embedded into the data image. In practice, the transmission module 16 is, for example, a signal transmission device directly connected to the server. In another embodiment, the transmission module 16 is connected to only the server. In another embodiment, if the output module is an email transmission module, the transmission module 16 can be integrated with the output module.

In an example, the feature is text content or pattern content, related to one or more key words existing in the document paper, and the one or more key words belong to confidential information within the document paper. In another example, the feature is text content or pattern content, related to a user identifier. Specifically, before a user attempts to use services supported by the multifunction printer 1, the user has to provide a user identifier indicating the user. This user identifier will be embedded into the data image. In yet another example, the feature is text content or pattern content, related to a source of the document paper, such as the original storage path of the document paper. Likewise, such instances of the feature can be embodied on the second encoded data, but the disclosure will not be limited thereto.

In an embodiment, the image processing module 12 further encrypts the first encoded data to generate third encoded data. Then, the transmission module 16 transmits the third encoded data. In an embodiment, the image processing module 12 further encrypts the second encoded data to generate third encoded data, and the third encoded data is transmitted by the transmission module 16. Therefore, the information security against the transmission of encoded data may be tightened.

In an embodiment, as described in FIG. 1, the multifunction printer 1 further includes a memory module 18 coupled to the image processing module 12. The first encoded data and the second encoded data are temporarily stored in the memory module 18 before further being processed (e.g. transmitted or printed). After transmitting a piece of encoded data, the multifunction printer 1 deletes this transmitted encoded data from the memory module 18. In an embodiment, the memory module 18 is a volatile memory module. After the multifunction printer 1 is disconnected, all data temporarily stored therein is spontaneously eliminated. In another embodiment, the memory module 18 is a non-volatile memory module for temporarily storing encoded data and lastingly storing profiles or log records related to the multifunction printer 1.

Figure 2:
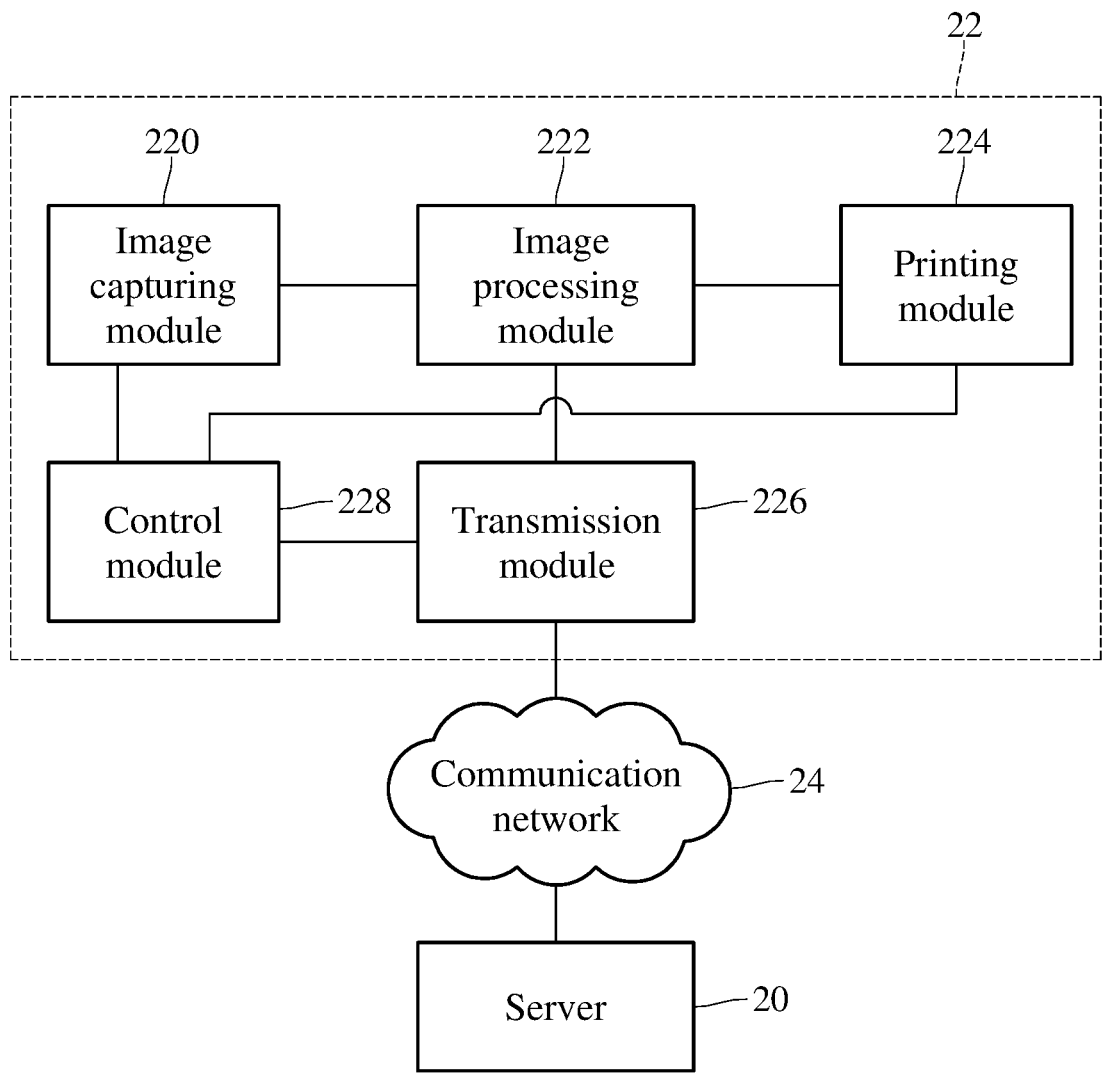
FIG. 2 is a schematic structure diagram of an information security management system in an embodiment.

Please refer to FIG. 2. FIG. 2 is a schematic structure diagram of an information security management system 2 in an embodiment. The information security management system 2 includes a server 20 and a multifunction printer 22. The multifunction printer 22 is connected to the server 20 through the communication network 24. The multifunction printer 22 includes an image capturing module 220, an image processing module 222, a printing module 224 and a transmission module 226. The image capturing module 220 captures a data image of a document paper. The image processing module 222 is coupled to the image capturing module 220 and encodes the data image to generate first encoded data.

The printing module 224 is coupled to the image processing module 222 and prints second encoded data. The transmission module 226 is coupled to the image processing module 222 and sends the first encoded data and the second encoded data to the server 20 through the communication network 24. In practice, the first encoded data and the second encoded data are generated by scanning, copying or printing the document paper by the multifunction printer 22. The relevant operation is the same as the embodiments in FIG. 1 and thus, will not be repeated hereinafter.

Moreover, after transmitting the first encoded data, the multifunction printer 22 deletes the first encoded data from a memory; and after transmitting the second encoded data, the multifunction printer 22 deletes the second encoded data from the memory. In practice, the multifunction printer 22 not only deletes encoded data after transmitting it, but also is not disposed with any non-volatile storage interface, e.g. a built-in hard disk drive or a USB port that is used to connect other external storage devices, for storing encoded data. Therefore, no data will lastingly be stored in the multifunction printer 22. In addition, the server 20 selectively generates a first information security alarm message according to the first encoded data. Likewise, the server 20 selectively generates a second information security alarm message according to the second encoded data. Specifically, the server 20 analyzes the contents of the first and second encoded data. If the server 20 discovers that the content of the encoded data threatens information security, the server 20 will send out a relative information security alarm message for follow-up processes.

In another embodiment, the server 20 performs text recognition, e.g. optical character recognition (OCR), to the first encoded data to generate at least one text content. The server 20 compares the at least one text content with a preset text content in order to decide whether to generate a first information security alarm message. In an example, the server 20 uses the optical character recognition technology to extract the confidential level of the first encoded data from a certain section of the first encoded data, and compares it with one or more preset high confidential levels. If there is a match in the comparisons, it means that the first encoded data comes from a high confidential document paper, and a relative first information security alarm message should be sent out. In yet another embodiment, the server 20 uses the optical character recognition technology to perform full text recognition to the first encoded data to search for any text content related to the confidential information, such as the company's important technique information, financial information or personnel information, in the first encoded data. If such text content is detected, a relative first information security alarm message will be sent out. Similarly, the server 20 performs text recognition to the second encoded data to generate at least one text content, and compares the at least one text content with the preset text content to determine whether to generate a second information security alarm message.

In yet another embodiment, the server 20 performs pattern recognition to the first encoded data to generate at least one pattern content. The server 20 compares the at least one pattern content with a preset pattern content to decide whether to generate a first information security alarm message. For example, the server 20 employs the pattern recognition technology to extract one or more confidential patterns, corresponding to the first encoded data, from a specific section of the first encoded data and compares it with one or more preset high confidential patterns. If there is a match in the comparisons, it means that the first encoded data comes from a high confidential document paper, and a relative first information security alarm message should be sent out.

In yet another embodiment, the server 20 employs the pattern recognition technology to search for any pattern content, related to confidential information such as the company's important technique information, in the first encoded data. If such pattern content is detected, a relative first information security alarm message will be sent out.

Similarly, the server 20 can perform pattern recognition to the second encoded data to generate at least one pattern content, and compares the at least one pattern content with a preset pattern content in order to decide whether to generate a second information security alarm message.

In yet another embodiment, the image processing module 222 combines the data image and a feature related to the document paper into first encoded data. In practice, the server 20 compares the feature in the first encoded data with a preset feature to decide whether to generate a first information security alarm message.

In an example, the feature is text content or pattern content, related to one or more key words within the document paper, and the key word is the confidential information within the document paper. The server 20 checks whether the feature, indicating the confidential information of the first encoded data, matches one or more preset high confidential levels. If yes, it means that the first encoded data comes from a document paper of a high confidential level, and a relative first information security alarm message should be sent out.

In another example, the feature is text content or pattern content, related to a source of the document paper, such as an original storage path of the document paper. The server 20 determines whether the feature, related to the original storage path, in the first encoded data matches one or more preset storage paths. If yes, it means that the first encoded data comes from a restricted storage path, and a relative first information security alarm message should be sent out.

In yet another example, the feature is text content or pattern content, related to a user identifier. Specifically, before a user attempts to use a service supported by the multifunction printer 22, the user has to provide a user identifier indicating the user. This user identifier will be embedded into the data image. The server 20 checks whether the user identifier matches one or more preset user identifiers. If yes, it means that the first encoded data comes from a restricted user, and a relative first information security alarm message should be sent out.

In yet another example, the feature is a combination of the foregoing embodiment with respect to the user identifier, and the forgoing one or more embodiments with respect to the text or pattern recognition. Specifically, the server 20, according to the user identifier and the confidential information, which is obtained during the text or pattern recognition, determines whether the user has any authority to access the document paper corresponding to the first encoded data. If no, a relative first information security alarm message will be sent out.

The above instances can be applied to the second encoded data to generate a relative second information security alarm message, but the disclosure will not be limited thereto.

In an embodiment, as shown in FIG. 2, the multifunction printer 22 further includes a control module 228 coupled to the image capturing module 222 and the transmission module 226. When the server 20 selectively sends a first stop command through the communication network 24 according to the first encoded data, the control module 228, according to the first stop command, selectively stops the image capturing module 220 from photographing the document paper. In an embodiment, the control module 228 is also coupled to the printing module 224. The server 20, according to the second encoded data, selectively sends a second stop command through the communication network 24, and then the control module 228, according to the second stop command, stops the printing module 224 from printing the second encoded data. In practice, the server 20 employs the aforementioned determination processes of generating the first and second information security alarm messages to decide whether to send out the first stop command and the second stop command. Therefore, when the information security is threatened, the server 20 not only sends out a relative alarm message but also uses the communication network 24 to limit/stop the operation of the multifunction printer 22.

In an embodiment, the image processing module 222 further encrypts the first encoded data to generate third encoded data. Then, the transmission module 226 transmits the third encoded data. Likewise, the image processing module 222 also encrypts the second encoded data to generate third encoded data, and the transmission module 226 transmits the third encoded data. Therefore, the information security against the transmission of encoded data may be tightened.

In view of the above embodiments, the encoded data generated by the multifunction printer is deleted from the memory after being transmitted to a device outside the multifunction printer. This may prevent information from being hacked. Moreover, the encoded data generated by the multifunction printer is transmitted to the server through a communication network for the analysis of information security, which is used to determine whether to output a relative alarm message. This may efficiently tighten the ability of managing the information security.

Additionally, the disclosure can be applied to any apparatus requiring information security management, such as information security management systems in companies. The information security management system 2 includes a data processing end and a server end. The server end is communicated with the data processing end. The data processing end is configured to acquire at least one piece of data to be processed, process the acquired data to be processed in response to a command, and output a piece of encoded data related to the acquired data to be processed and the command. After the data processing end outputs the encoded data, the data processing end deletes the acquired data to be processed and the encoded data. Information used in a terminal device in the system is transmitted to a server end after being processed, and then such information will be deleted from the terminal device. Also, the information sent to the server end includes data about how this information is processed (e.g. printed, faxed or mailed). If the server end discovers that any piece of information is subjected to a forbidden process (e.g. printing a document paper, which is forbidden to be printed, in a specific condition), the server end will generate a first information security alarm message for warning in response to the encoded data warn.

What is claimed is:

1. A multifunction printer comprising:
   an image capturing module configured to capture a data image of a document paper;
   an image processing module coupled to the image capturing module and configured to encoding the data image to generate first encoded data;
   an output module coupled to the image processing module and configured to output second encoded data related to the data image, and send at least one of the first and second encoded data to a server; and
   a memory module coupled to the image processing module and configured to store the first encoded data and the second encoded data,
   wherein the first encoded data is deleted after the output module sends the first encoded data, and the second encoded data is deleted after the output module outputs the second encoded data, and wherein the first encoded data is deleted after being outputted by a transmission module, and the second encoded data is deleted after being outputted by the output module.

2. The multifunction printer according to claim 1, wherein the image processing module further encrypts the first encoded data to generate a third encoded data, and a transmission module sends the third encoded data.

3. The multifunction printer according to claim 1, wherein the memory module is a volatile memory module or a non-volatile memory module.

4. The multifunction printer according to claim 1, wherein the image processing module combines the data image and a feature related to the document paper into the first encoded data.

5. An information security management system comprising:
   a data processing end configured to acquire at least one piece of data to be processed, process the acquired data to be processed in response to a command, and output a piece of encoded data related to the acquired data to be processed and the command; and
   a server end communicated with the data processing end and configured to generate a first information security alarm message in response to the encoded data;
   wherein after the data processing end outputs the encoded data, the data processing end deletes the acquired data to be processed and the encoded data.

6. An information security management system comprising:
   a server; and
   a multifunction printer configured to connect to the server through a communication network, and comprising:
     an image capturing module configured to capture a data image of a document paper;
     an image processing module coupled to the image capturing module and configured to encode the data image into first encoded data; and
     an output module coupled to the image processing module and configured to output second encoded data related to the data image, and send at least one of the first and second encoded data to the server through the communication network;
   wherein the multifunction printer deletes the first encoded data after the output module sends out the first encoded data; the multifunction printer deletes the second encoded data after the output module outputs the second encoded data; and the server selectively generates a first information security alarm message according to the first encoded data.

7. The information security management system according to claim 6, wherein the server selectively generates a second information security alarm message according to the second encoded data.

8. The information security management system according to claim 6, wherein the first encoded data comprises an image source.

9. The information security management system according to claim 8, wherein the image source is user information, an IP address or a computer ID.

10. The information security management system according to claim 6, wherein the server performs text recognition to the first encoded data to generate at least one text content, compares the at least one text content with a preset text content, and selectively generates the first information security alarm message according to the comparison.

11. The information security management system according to claim 6, wherein the server performs pattern recognition to the first encoded data to generate at least one pattern content, compares the at least one pattern content with a preset pattern content, and selectively generate the first information security alarm message according to the comparison.

12. The information security management system according to claim 6, wherein the image processing module combines the data image and a feature related to the document paper into the first encoded data.

13. The information security management system according to claim 12, wherein the server compares the feature in the first encoded data with a preset feature in order to decide whether to generate the first information security alarm message.

14. The information security management system according to claim 6, wherein the multifunction printer further comprises a control module coupled to the image capturing module and the output module, the server selectively outputs a first stop command through the communication network according to the first encoded data, and the control module, according to the first stop command, selectively stops the image capturing module from photographing the document paper.

15. The information security management system according to claim 14, wherein the control module is coupled to the output module, the server selectively sends out a second stop command through the communication network according to the second encoded data, and the control module, according to the second stop command, selectively stops the output module from outputting the second encoded data.

16. The information security management system according to claim 6, wherein the image processing module further encrypts the first encoded data to generate a third encoded data, and a transmission module sends the third encoded data to the server through the communication network.

* * * * *